United States Patent Office 3,341,414
Patented Sept. 12, 1967

---

3,341,414
N-CYCLOHEXYLSULFAMATE SOLUBILIZED MEDICATION
Max A. Cherkas, Philadelphia, and William R. Ross, Jr., Oreland, Pa., assignors to Merck & Co., Inc., Rahway, N.J., a corporation of New Jersey
No Drawing. Filed Aug. 27, 1964, Ser. No. 392,597
7 Claims. (Cl. 167—82)

This invention relates to a composition and method for providing a medicated hard candy (hereinafter referred to as a lozenge) and more particularly to provide for a pharmaceutically elegant clear shaped lozenge by solubilizing the normally insoluble medicinal components.

Medicated confectionery compositions in semi-solid and solid forms are difficult to prepare and moreover lack pharmaceutical elegance when the medicinal ingredients employed are insoluble in the lozenge base or are susceptible to decomposition or other chemical alteration under the conditions of preparation of the lozenge. Similarly, when the medicinal agents are not dissolved or are not dispersed homogeneously in the lozenge matrix it is difficult or impossible to mask effectively their unpleasant flavor. In addition, attempts to solve these and other problems must be accomplished within the critical physical limitations existing in the art of candy making. For example, heretofore it has only been possible to incorporate 4–5% by weight of solid medicaments into a hard candy lozenge because larger amounts produced an opaque mass rather than a clear composition and tended to induce undesirable crystallization of the lozenge candy base as well as having the inherent disadvantages described.

For these and other reasons that will later be apparent, it is an object of this invention to incorporate substantially large amounts of relatively insoluble medicinal agents into a confectionery base so as to produce a clear, smooth-tasting lozenge.

It has been discovered that the above and other objects are achieved by incorporating into a hard candy base as little as one part of a pharmaceutically acceptable salt of N-cyclohexylsulfamic acid to six parts of the added amount of the particular medicament chosen for use in the lozenge. It is of additional advantage that the salt of N-cyclohexylsulfamic acid (hereinafter referred to as cyclamate) chosen, also masks the objectionable, unpleasant taste sensation, especially the bitterness, which sometimes accompanies the oral administration of certain medicinal agents. This latter quality is of great advantage in promoting the administration of certain pharmaceutical and therapeutic agents. The use of the sodium and calcium salts of N-cyclohexylsulfamic acid in pharmaceutical formulations has established that they are inert, safe and exhibit no drug action. Their use in a pharmaceutical formulation need not be declared on the label. (See Federal Register, Nov. 20, 1959, page 9369.)

The solubilizing effect of the preferred alkali metal salts, such as sodium, potassium and calcium cyclamate, upon various medicinal agents has been determined. Acetaminophen (4'-hydroxyacetanilide) and salicylamide are examples of analgesics which are so solubilized. When compounding lozenges employing for example, acetaminophen solubilized by sodium cyclamate, it is possible and sometimes desirable to include other pharmateutical and/or therapeutic ingredients into the lozenge. Among antibacterial agents which are compatible with the major ingredients and do not alter the solubilizing action of cyclamate are Cetol (cetyl diethyl benzylammonium chloride), Ethyl Cetab (cetyl ethyl dimethylammonium bromide), and Hyamine 1622 (benzethonium chloride).

Also anesthetic agents such as Benzocaine (ethyl p-aminobenzoate) may be included in the whole composition.

An additional advantage of the use of the particular solubilizing agents of this invention resides in the fact that it makes it possible to add active ingredients to the "pre-cook" or candy base ingredients and then subject these ingredients to the high temperature (ca. 135° C.) required for candy processing without affecting the physical and chemical stability of the ingredients or the candy lozenge. Ordinarily, the temperature necessary to establish a merge of the mix is usually so high that decomposition of the active medicinal ingredients occurs, however with the discovery of the solubilizing agents of this invention the active ingredients remain stable during the lozenge making process and exhibit remarkable good shelf-life thereafter.

Examples of medicinal confectionery compositions according to this invention are as follows:

Example 1

| | Per lozenge |
|---|---|
| Sugar | gm__ 3.1 |
| Corn syrup (dry basis) | gm__ 1.5 |
| Cyclamate sodium | mg__ 50 |
| Acetaminophen | mg__ 300 |
| Benzocaine | mg__ 5 |
| Ethyl Cetab | mg__ 2 |
| Sour orange flavor, q.s. | |
| Wild cherry flavor, q.s. | |

Example 2

| | Per lozenge |
|---|---|
| Sugar | gm__ 3.1 |
| Corn syrup (dry basis) | gm__ 1.5 |
| Cyclamate calcium | mg__ 50 |
| Salicylamide | mg__ 300 |
| Benzocaine | mg__ 5 |
| Ethyl Cetab | mg__ 2 |
| Anise mint flavor, q.s. | |

Example 3

| | Per lozenge |
|---|---|
| Sugar | gm__ 3.1 |
| Corn syrup (dry basis) | gm__ 1.5 |
| Cyclamate sodium | mg__ 50 |
| Acetaminophen | mg__ 300 |
| Benzocaine | mg__ 5 |
| Cetol | mg__ 2 |
| Sour orange flavor, q.s. | |
| Wild cherry flavor, q.s. | |

Example 4

| | Per lozenge |
|---|---|
| Sugar | gm__ 3.1 |
| Corn syrup (dry basis) | gm__ 1.5 |
| Cyclamate calcium | mg__ 50 |
| Salicylamide | mg__ 300 |
| Benzocaine | mg__ 5 |
| Cetol | mg__ 2 |
| Anise mint flavor, q.s. | |

Example 5

| | Per lozenge |
|---|---|
| Sugar | gm__ 3.1 |
| Corn syrup (dry basis) | gm__ 1.5 |
| Cyclamate sodium | mg__ 50 |
| Acetaminophen | mg__ 300 |
| Benzocaine | mg__ 5 |
| Hyamine 1622 | mg__ 2 |
| Sour orange flavor, q.s. | |
| Wild cherry flavor, q.s. | |

Example 6

| | Per lozenge | |
|---|---|---|
| Sugar | gm | 3.1 |
| Corn syrup (dry basis) | gm | 1.5 |
| Cyclamate calcium | mg | 50 |
| Salicylamide | mg | 300 |
| Benzocaine | mg | 5 |
| Hyamine 1622 | mg | 2 |
| Anise mint flavor, q.s. | | |

Example 7

| | Per lozenge | |
|---|---|---|
| Sugar | gm | 3.1 |
| Corn syrup (dry basis) | gm | 1.5 |
| Cyclamate sodium | mg | 100 |
| Acetaminophen | mg | 300 |
| Benzocaine | mg | 5 |
| Ethyl Cetab | mg | 2 |
| Sour orange flavor, q.s. | | |
| Wild cherry flavor, q.s. | | |

Example 8

| | Per lozenge | |
|---|---|---|
| Sugar | gm | 3.1 |
| Corn syrup (dry basis) | gm | 1.5 |
| Cyclamate sodium | mg | 100 |
| Acetaminophen | mg | 300 |
| Benzocaine | mg | 5 |
| Cetol | mg | 2 |
| Sour orange flavor, q.s. | | |
| Wild cherry flavor, q.s. | | |

Example 9

| | Per lozenge | |
|---|---|---|
| Sugar | gm | 3.1 |
| Corn syrup (dry basis) | gm | 1.5 |
| Cyclamate sodium | mg | 100 |
| Acetaminophen | mg | 300 |
| Benzocaine | mg | 5 |
| Hyamine 1622 | mg | 2 |
| Sour orange flavor, q.s. | | |
| Wild cherry flavor, q.s. | | |

Example 10

| | Per lozenge | |
|---|---|---|
| Sugar | gm | 3.1 |
| Corn syrup (dry basis) | gm | 1.5 |
| Cyclamate calcium | mg | 100 |
| Salicylamide | mg | 300 |
| Benzocaine | mg | 5 |
| Ethyl Cetab | mg | 2 |
| Anise mint flavor, q.s. | | |

Example 11

| | Per lozenge | |
|---|---|---|
| Sugar | gm | 3.1 |
| Corn syrup (dry basis) | gm | 1.5 |
| Cyclamate calcium | mg | 100 |
| Salicylamide | mg | 300 |
| Benzocaine | mg | 5 |
| Ethyl Cetab | mg | 2 |
| Anise mint flavor, q.s. | | |

Example 12

| | Per lozenge | |
|---|---|---|
| Sugar | gm | 3.1 |
| Corn syrup (dry basis) | gm | 1.5 |
| Cyclamate calcium | mg | 100 |
| Salicylamide | mg | 300 |
| Benzocaine | mg | 5 |
| Hyamine 1622 | mg | 2 |
| Anise mint flavor, q.s. | | |

Example 13

| | Per lozenge | |
|---|---|---|
| Sugar | gm | 1.6 |
| Corn syrup (dry basis) | gm | 0.75 |
| Cyclamate sodium | mg | 50 |
| Acetaminophen | mg | 150 |
| Zinc bacitracin | units | 50 |
| Neomycin sulfate | mg | 3.5 |
| Tyrothricin | mg | 1.0 |
| Orange-mint flavor, q.s. | | |

From the amounts shown in the examples it is clear that solution of the active ingredient is possible using as little as one part of a salt of cyclohexylsulfamic acid for six parts of therapeutic compound. Obviously, increased amounts of the salt can be used with on adverse effect on solubilization.

A batch preparation of the lozenge according to this invention proceeds typically as follows. Two powder mixtures are prepared for introduction into the candy base mix.

Powder Mixture No. 1:

| | Kg. |
|---|---|
| Acetaminophen | 2.7 |
| Cyclamate sodium | 0.45 |

Powder Mixture No. 2:

| | Gm. |
|---|---|
| Saccharin sodium | 45.0 |
| Cetol | 27.0 |
| Benzocaine | 45.0 |

Place 28 kilo of granular sugar into a pre-cook kettle together with 14 liters of water. This mixture is brought to a boil and Powder Mixture No. 1 is added and dissolved with stirring in the mixture. Glucose 43° (16.7 kilo) then is added and the mixture is brought to a predetermined temperature preferably about 135° C. This composition then is transferred to a continuous vacuum cooker and reduced to a proper consistency for a candy base. Thereafter the candy base is collected on a revolving table and mixed with a pharmaceutically acceptable dye; Powder Mixture No. 2 (117 gm.); and the desired flavor. This mixture is kneaded, a rope formed and lozenges weighing approximately 5.0 gm. each are cut from the rope. The amounts given for the materials used will produce approximately 9,000 lozenges which can be packaged and distributed in any convenient manner.

By using the above described procedure, the ingredients of Examples 1 through 13 can be converted into stable, clear, smooth-tasting lozenges.

A number of different chemical compounds have been disclosed for use in this invention. In particular the sodium and calcium salts of cyclohexylsulfamic acid have been described as having special utility as solubilizing agents for various therapeutic agents.

Although this invention has been disclosed with reference to specific examples thereof it will be appreciated that the inventive concept is embodied in the provision of a solubilizing agent for incorporation of normally insoluble medicinal agents into a hard candy base or more particularly into lozenge form. It would therefore not be a departure from the spirit and scope of this invention to utilize various pharmaceutic and/or therapeutic agents singly or in combination in the method and product of this invention or to make other immaterial variations for example the substitution of other well known flavoring agents such as lemon, guarana, passion fruit, green apple, lime, grape and the like for those used in the examples.

Having thus described our invention, we claim:

1. A shaped medicinal composition consisting essentially of an alkali metal salt of cyclohexylsulfamic acid, an effective amount of a normally insoluble medicinial agent, and a candy base carrier, said alkali metal salt present in an amount sufficient to solubilize said medicinal agent.

2. A shaped medicinal composition consisting essentially of a normally insoluble medicinal agent, at least one part by weight of an alkali metal salt of cyclohexylsulfamic acid per six parts of said medicinal agent, and a candy base carrier.

3. The medicinal composition of claim 2 wherein said medicinal agent is selected from the class consisting of N-acetyl-p-aminophenol and salicylamide.

4. The medicinal composition of claim 3 wherein said medicinal agent is present in combination with at least one other compatible agent selected from the group consisting of a pharmaceutical agent and a therapeutic agent.

5. A clear, shaped medicinal composition for oral administration consisting essentially of a hard candy base, an effective amount of at least one medicinal agent which is normally insoluble in said hard candy base; in combination with a solubilizing agent chosen from the group consisting of sodium cyclamate and calcium cyclamate, in the amount sufficient to solubilize said medicinal agent.

6. In a method of making a clear, smooth tasting medicated hard candy lozenge the steps which comprise preparing a candy base comprising sugar, glucose, and water, adding to said candy base an effective amount of at least one medicinal agent and an alkali metal cyclamate as solubilizing agent, reducing the volume of the mixture at an elevated temperature to form a molten medicated candy base, coloring and flavoring said candy base, cooling and forming lozenges.

7. In a method of making a medicated hard candy product with a sugar and glucose base the steps which comprise adding to said base 5 to 25% by weight of at least one medicinal agent and at least about 0.8 to about 4% by weight of a solubilizing agent selected from the group consisting of sodium cyclamate and calcium cyclamate; adding coloring and flavoring matter, blending and forming a shaped medicinal product.

References Cited

UNITED STATES PATENTS

| | | | |
|---|---|---|---|
| 2,275,125 | 3/1942 | Audrieth et al. | 260—500 X |
| 2,746,986 | 5/1956 | Sahyun et al. | 260—501 |
| 3,223,704 | 12/1965 | Shibe et al. | 260—501 X |

LEWIS GOTTS, *Primary Examiner.*

S. K. ROSE, *Assistant Examiner.*